US012563066B2

(12) United States Patent
Watanabe

(10) Patent No.: US 12,563,066 B2
(45) Date of Patent: Feb. 24, 2026

(54) MATCHING DEVICE, MATCHING METHOD, AND MATCHING PROGRAM

(71) Applicant: NTT, Inc., Tokyo (JP)

(72) Inventor: Takuya Watanabe, Musashino (JP)

(73) Assignee: NTT, Inc., Tokyo (JP)

( * ) Notice: Subject to any disclaimer, the term of this patent is extended or adjusted under 35 U.S.C. 154(b) by 106 days.

(21) Appl. No.: 18/285,865

(22) PCT Filed: Apr. 12, 2021

(86) PCT No.: PCT/JP2021/015195
§ 371 (c)(1),
(2) Date: Oct. 6, 2023

(87) PCT Pub. No.: WO2022/219683
PCT Pub. Date: Oct. 20, 2022

(65) Prior Publication Data
US 2024/0187435 A1 Jun. 6, 2024

(51) Int. Cl.
*H04L 9/40* (2022.01)

(52) U.S. Cl.
CPC .......... *H04L 63/1425* (2013.01); *H04L 63/20* (2013.01)

(58) Field of Classification Search
CPC .......................... H04L 63/1425; H04L 63/20
USPC ........................................................ 726/22
See application file for complete search history.

(56) References Cited

U.S. PATENT DOCUMENTS

| | | | |
|---|---|---|---|
| 10,771,497 B1 * | 9/2020 | Xie ..................... | H04L 63/1425 |
| 2006/0197981 A1 * | 9/2006 | Honma .............. | H04N 1/32561 358/1.15 |
| 2021/0218655 A1 * | 7/2021 | Zheng ................. | H04L 61/5007 |
| 2024/0007436 A1 * | 1/2024 | Waters ................... | H04L 63/20 |

OTHER PUBLICATIONS

Yazdani et al., "Fast and Scalable schemes for the IP address Lookup Problem", High Performance Switching and Routing, 2000, pp. 83-92.
Yim et al., "Efficient Binary Search for IP Address Lookup", IEEE Communications Letters, vol. 9, Issue: 7, Jul. 2005, pp. 652-654.
Mun et al., "New Approach for Efficient IP Address Lookup Using a Bloom Filter in Trie-Based Algorithms", IEEE Transactions on Computers, vol. 65, Issue: 5, May 2016, pp. 1558-1565.

* cited by examiner

*Primary Examiner* — Anthony D Brown
(74) *Attorney, Agent, or Firm* — XSENSUS LLP

(57) ABSTRACT
A matching device includes processing circuitry configured to generate, for each IP address range in a list indicating reference IP address ranges, a record indicating a start IP address and a record indicating an end IP address in the IP address range, combine the record indicating a start IP address and the record indicating an end IP address of each of the reference IP address ranges and a record indicating an IP address to be matched, sort a combined record group using an IP address of the record as a primary key and information indicating whether the record is a record of the IP address to be matched, a record indicating the start IP address, or a record of the end IP address as a secondary key, and determine that the IP address to be matched matches an IP address range.

18 Claims, 8 Drawing Sheets

LIST OF IP ADDRESSES
TO BE MATCHED

LIST OF REFERENCE
IP ADDRESSES (1) ASSIGN INDEX TO LIST OF REFERENCE IP ADDRESSES (2) DIVIDE RANGE OF LIST OF REFERENCE IP ADDRESSES INTO START IP ADDRESS
AND END IP ADDRESS (3) COMBINE WITH LIST OF IP ADDRESSES TO BE MATCHED (4) SORT IN ASCENDING ORDER ACCORDING TO FOLLOWING RULES

•PRIMARY KEY       IP ADDRESS (SORT AS INTEGER VALUES)

•SECONDARY KEY    SORT IN ORDER OF BEGIN<TARGET<END

| 0 | 1.1.1.1 | BEGIN |
| – | 1.1.1.2 | TARGET |
| 0 | 1.1.1.10 | END |
| – | 1.1.3.5 | TARGET |
| 1 | 1.2.3.1 | BEGIN |
| 1 | 1.2.3.40 | END |

↤∽301

(5) PROCESS IN ORDER FROM TOP

| 0 | 1.1.1.1 | BEGIN |
| – | 1.1.1.2 | TARGET |
| 0 | 1.1.1.10 | END |
| – | 1.1.3.5 | TARGET |
| 1 | 1.2.3.1 | BEGIN |
| 1 | 1.2.3.40 | END |

↤∽302

1.1.1.2 IS INCLUDED
IN IP ADDRESS RANGE WITH INDEX 0

MATCHING DEVICE, MATCHING METHOD, AND MATCHING PROGRAM

CROSS-REFERENCE TO RELATED APPLICATION

The present application is based on PCT filing PCT/JP2021/015195, filed Apr. 12, 2021, the entire contents of which are incorporated herein by reference.

TECHNICAL FIELD

The present invention relates to an IP address matching device, a matching method, and a matching program.

BACKGROUND ART

In order to detect a suspicious access to a server or the like, which one of accesses indicated in an access log to the server is an access from a proxy server or a malicious IP address, and in a case where there is an access from a proxy server, what type of proxy server the access is from is identified.

Here, in a case where the server is a server that accepts many accesses, it is necessary to perform matching between a list of a large number of IP addresses (single IP addresses) of access sources and a list of a large number of IP addresses (including IP address ranges) such as a list of IP addresses of proxy servers or malicious IP addresses.

CITATION LIST

Non Patent Literature

Non Patent Literature 1: N. Yazdani, et al., Fast and Scalable schemes for the IP address Lookup Problem, High Performance Switching and Routing, 2000. ATM 2000.

Non Patent Literature 2: Changhoon Yim, et al., Efficient Binary Search for IP Address Lookup, IEEE Communications Letters (Volume: 9, Issue: 7, July 2005)

Non Patent Literature 3: Ju Hyoung Mun, et al., New Approach for Efficient IP Address Lookup Using a Bloom Filter in Trie Based Algorithms, IEEE Transactions on Computers (Volume: 65, Issue: 5, May 1, 2016)

SUMMARY OF INVENTION

Technical Problem

Here, in a case where the number of IP addresses of access sources and the number of IP address ranges of the list of IP addresses of proxy servers and malicious IP addresses (list of reference IP addresses) are enormous, the time required for matching becomes enormous.

For example, when the number of IP addresses of access sources is M and the number of IP address ranges in the list of reference IP addresses is N, the time calculation amount required for matching the IP addresses is O (MN).

Moreover, it is also conceivable to match an IP address group obtained by expanding an IP address range in the list of reference IP addresses with each of the IP addresses of the access sources by a hash or the like. According to such a method, the time calculation amount required for matching is O (M), but the memory use amount (space calculation amount) may become enormous depending on the size of the IP address range indicated by the list of reference IP addresses.

Note that while there is also a high-speed matching method for IP address lookup (see Non Patent Literatures 1, 2, and 3), this method does not consider a case where the IP address of the access source matches a plurality of IP address ranges.

Against this background, an object of the present invention is to solve the above-described problem and reduce the amount of calculation when matching lists of a large number of IP addresses.

Solution to Problem

In order to solve the above problem, a matching device includes: processing circuitry configured to: generate, for each IP address range in a list indicating reference IP address ranges, a record indicating a start IP address and a record indicating an end IP address in the IP address range; combine the record indicating a start IP address and the record indicating an end IP address of each of the reference IP address ranges and a record indicating an IP address to be matched; sort a combined record group using an IP address of the record as a primary key and information indicating whether the record is a record of the IP address to be matched, a record indicating the start IP address, or a record of the end IP address as a secondary key; determine that the IP address to be matched matches an IP address range in a case where there is the record of the IP address to be matched between the record indicating a start IP address and the record indicating an end IP address in any of the IP address ranges in the sorted record group; and output a result of the determination.

Advantageous Effects of Invention

According to the present invention, it is possible to reduce the amount of calculation when matching lists of a large number of IP addresses.

DESCRIPTION OF EMBODIMENTS

Hereinafter, a mode for carrying out the present invention (embodiment) will be described with reference to the drawings. The present invention is not limited to the embodiment described below.

Note that in the following description, a matching device performs matching between a list of IP addresses to be matched and a list of reference IP addresses. The list of reference IP addresses is, for example, a list of IP addresses that may be malicious, and is a list of IP addresses of proxy servers, a list of malicious IP addresses, or the like.

Moreover, a case where each IP address group in the list of IP addresses to be matched is a single IP address will be described as an example. Moreover, a case where each IP address group in the list of reference IP addresses is a single IP address or an IP address range will be described as an example. Moreover, each list is, for example, a large-scale list having a total amount of 1 M or more.

Figure 1:
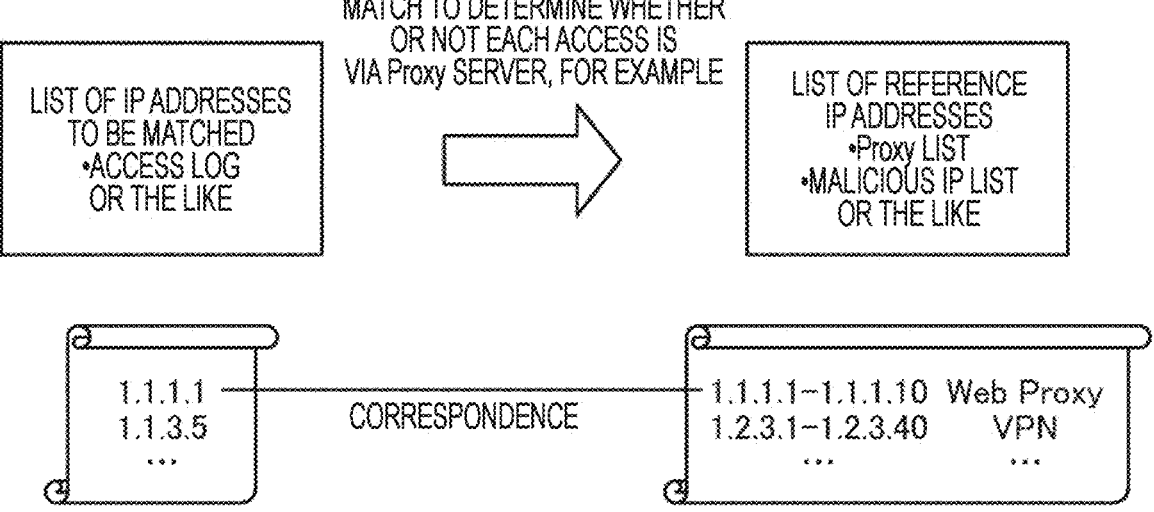
FIG. 1 is a diagram illustrating an outline of a matching device.

[Outline] First, an outline of a matching device according to the present embodiment will be described with reference to FIG. 1. The matching device matches a list of IP addresses to be matched (e.g., IP addresses or the like of access sources acquired from access log) with a list of reference IP addresses.

For example, the matching device determines whether or not each access is via a proxy server by matching a list of IP addresses of access sources with a list of reference IP addresses. For example, when an IP address of an access source corresponds to an IP address (IP address range) of a proxy server in the list of reference IP addresses, the matching device determines that the access is via the proxy server. As a result, the matching device can determine whether or not there is a possibility that the access from the IP address of the access source is a malicious access.

A general operation of the matching device will be described with reference to FIGS. 2 and 3. First, the matching device assigns an index to each IP address range in the list of reference IP addresses (FIG. 2 (1) assign index to list of reference IP addresses).

Next, the matching device divides each IP address range in the list of reference IP addresses into a record of a start IP address of the range and a record of an end IP address of the range ((2) Divide range of list of reference IP addresses into start IP address and end IP address).

At this time, the matching device adds information (e.g., BEGIN) indicating that the record is a record of a start IP address to a record of the start IP address, and adds information (e.g., END) indicating that the record is a record of an end IP address to a record of the end IP address.

Next, the matching device combines the list subjected to the processing of (2) with the list of IP addresses to be matched ((3) combine with list of IP addresses to be matched). At this time, the matching device adds information (e.g., TARGET) indicating that the record is a record of an IP address to be matched to a record of an IP address to be matched.

Figure 2:
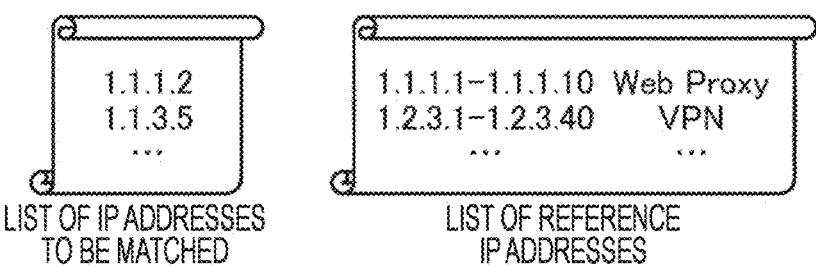
FIG. 2 is a diagram illustrating a general operation of the matching device.
Figure 2:
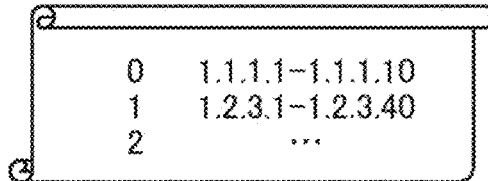
Figure 2:
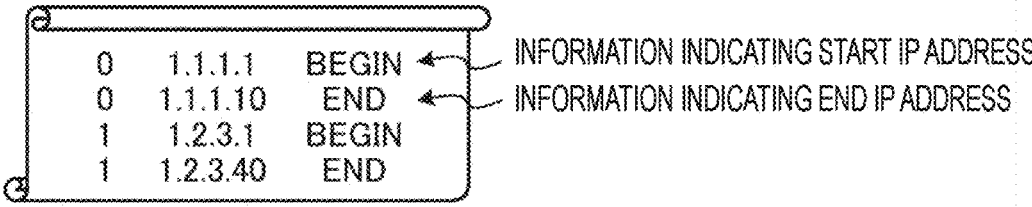
Figure 2:
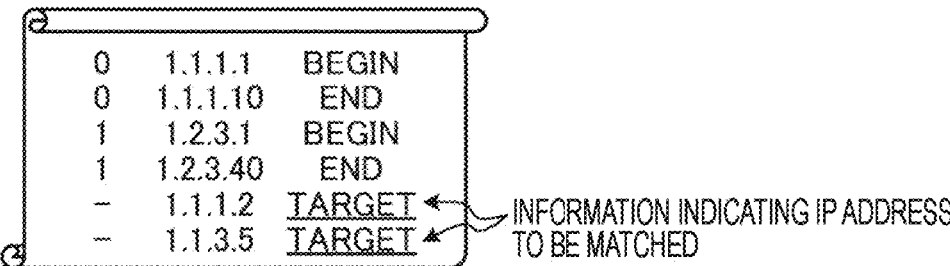
Figure 3:
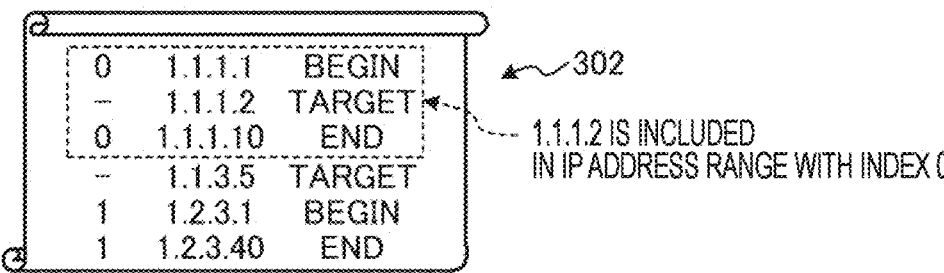
FIG. 3 is a diagram illustrating a general operation of the matching device.

The description proceeds to FIG. 3. The matching device sorts records in the list subjected to the processing in (3) of FIG. 2 in ascending order according to the following rules ((4) sort in ascending order according to following rules).

Primary key: IP address (sort IP address as integer values)
Secondary key: sort in order of BEGIN<TARGET<END According to the above rules, the records are sorted as indicated by reference numeral 301 in FIG. 3, for example.

Thereafter, the matching device determines whether or not there is a record of an IP address to be matched between the record of a start IP address and the record of an end IP address having the same index in order from the top for the records sorted in (4) ((5) process in order from top).

For example, the matching device determines that an IP address to be matched (TARGET) 1.1.1.2 exists between the start IP address (BEGIN) and the end IP address (END) of the index 0 (1.1.1.1-1.1.1.10) in a part surrounded by a broken line of a list indicated by reference numeral 302 in FIG. 3. Therefore, the matching device determines that the IP address 1.1.1.2 to be matched is included in (matches) the IP address range with the index 0 (1.1.1.1-1.1.1.10) of the reference IP address.

The matching device performs matching of the lists of IP addresses as described above, so that the amount of calculation required for matching can be reduced even if the scale of each list is large.

For example, in a case where the number of IP addresses in the list of IP addresses to be matched is M, and the number of IP address ranges in the list of reference IP addresses is N, the space calculation amount required for matching the IP addresses in the lists can be O (M+N). Moreover, for example, in a case where the sorting algorithm used for matching is Timsort, the time calculation amount required for matching the IP addresses in the lists can be O ((M+N) log (M+N)).

Figure 4:
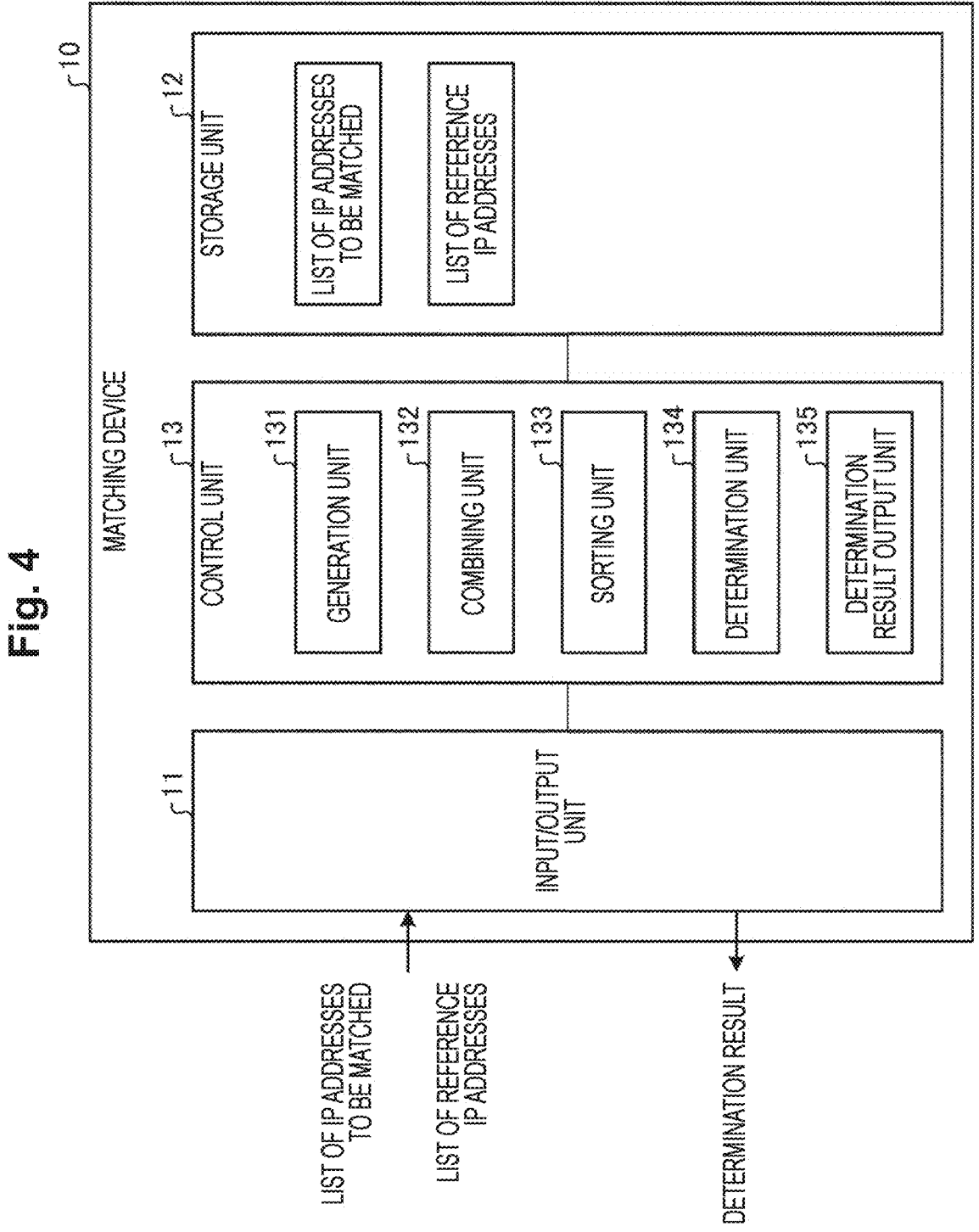
FIG. 4 is a diagram illustrating a configuration example of the matching device.

[Configuration Example] Next, a configuration example of the matching device will be described with reference to FIG. 4. As illustrated in FIG. 4, a matching device 10 includes an input/output unit 11, a storage unit 12, and a control unit 13.

The input/output unit 11 is an interface that controls input and output of various data. For example, the input/output unit 11 accepts input of a list of IP addresses to be matched, a list of reference IP addresses, and the like. Note that the IP address in each list may be an IPv4 IP address or an IPv6 IP address.

The storage unit 12 stores various pieces of data to be referred to when the control unit 13 performs various types of processing. For example, the storage unit 12 stores a list of IP addresses to be matched and a list of reference IP addresses input via the input/output unit 11. Moreover, the storage unit 12 temporarily stores data created in the process of performing matching by the control unit 13.

The control unit 13 controls the entire matching device 10. The control unit 13 includes, for example, a generation unit 131, a combining unit 132, a sorting unit 133, a determination unit 134, and a determination result output unit 135.

The generation unit 131 generates, for each IP address range in the list of reference IP addresses, a record indicating a start IP address and a record indicating an end IP address of the range of IP addresses.

For example, the generation unit 131 first adds an index for each IP address range in the list of reference IP addresses (see (1) in FIG. 2). Then, the generation unit 131 generates a record of a start IP address and a record of an end IP address in the IP address range for each IP address range.

Then, the generation unit 131 adds information (e.g., BEGIN) indicating that the record is a record of a start IP address to the record of the start IP address of the IP address range. Moreover, the generation unit 131 adds information (e.g., END) indicating that the record is a record of an end IP address to the record of the end IP address of the IP address range (see (2) in FIG. 2).

The combining unit 132 combines the records generated by the generation unit 131 and the records of IP addresses in the list of IP addresses to be matched. Further, at this time, the combining unit 132 adds information (For example, TARGET) indicating that the record is a record of an IP address to be matched to the record of the IP address to be matched (see (3) in FIG. 2).

The sorting unit 133 sorts the record group combined by the combining unit 132 by using the IP address of each record as a primary key and information (e.g., TARGET, BEGIN, END) indicating whether each record is a record of an IP address to be matched, a record of a start IP address, or a record of an end IP address as a secondary key (see (4) in FIG. 3). For example, the sorting unit 133 sorts the records in ascending order of BEGIN<TARGET<END.

As a result, for example, even when the IP address of a record to which TARGET is assigned matches the IP address of a record to which BEGIN or END is assigned, the sorting unit 133 can perform sorting such that the record to which TARGET is assigned is placed between a record to which BEGIN is assigned and a record to which END is assigned.

Note that the sorting algorithm used by the sorting unit 133 is, for example, Timsort or the like.

When there is a record of an IP address to be matched between a record of a start IP address and a record of an end IP address of any IP address range in the list of reference IP addresses in the records sorted by the sorting unit 133 (see (5) of FIG. 3), the determination unit 134 determines that the IP address to be matched corresponds to the IP address range.

Note that when there is no record of an IP address to be matched between a record indicating a start IP address and a record indicating an end IP address of any IP address range in the list of reference IP addresses in the records sorted by the sorting unit 133, the determination unit 134 determines that the IP addresses in the list of IP addresses to be matched do not correspond to any IP address range in the list of reference IP addresses.

The determination result output unit 135 outputs a result of the determination by the determination unit 134. For example, when the determination unit 134 determines that an IP address to be matched corresponds to an IP address range in a malicious IP list, the determination result output unit 135 outputs a determination result indicating that there is a possibility that the access from the IP address to be matched is a malicious access.

Moreover, the determination result output unit 135 may output, as a determination result, attribute information of an IP address range with which an IP address to be matched matches. For example, when the determination unit 134 determines that an IP address to be matched is included in an IP address range of a web proxy and an IP address range of a residential proxy, the determination result output unit 135 may output a determination result indicating that the IP address to be matched is an access from a web proxy and a residential proxy.

Figure 5:
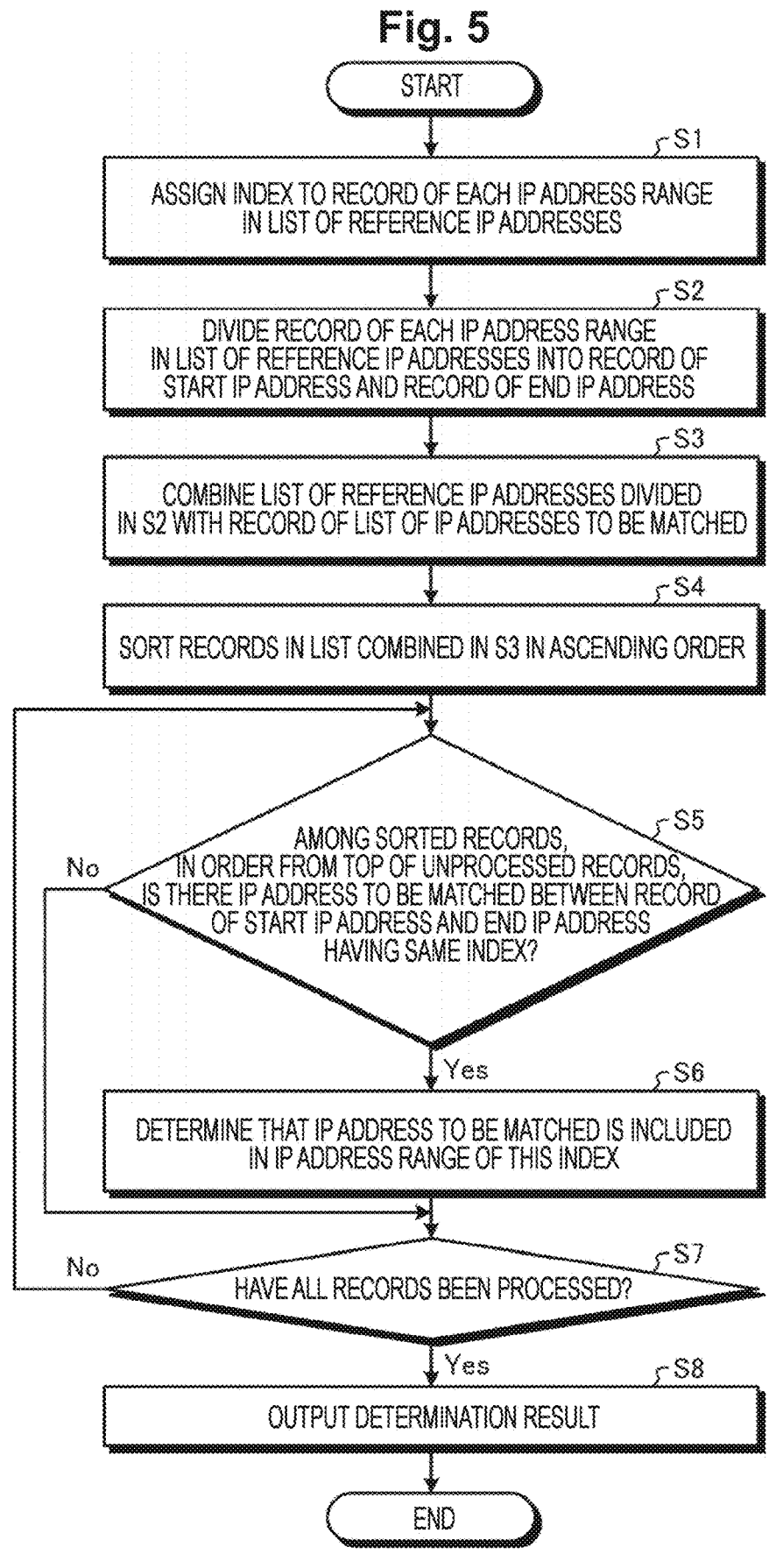
FIG. 5 is a flowchart illustrating an example of a processing procedure of the matching device.

[Example of Processing Procedure] Next, an example of a processing procedure of the matching device 10 will be described with reference to FIG. 5. Note that it is assumed that the matching device 10 has already acquired a list of reference IP addresses and a list of IP addresses to be matched.

First, the generation unit 131 of the matching device 10 assigns an index to a record of each IP address range in the list of reference IP addresses (S1). Next, the generation unit 131 divides the record of each IP address range in the list of reference IP addresses into a record of a start IP address and a record of an end IP address (S2). Then, the combining unit 132 combines the list of reference IP addresses divided in S2 with the record of the list of IP addresses to be matched (S3).

After S3, the sorting unit 133 sorts the records in the list combined in S3 in ascending order (S4). At this time, the primary key is an IP address, and the secondary key is information (e.g., TARGET, BEGIN, END) indicating whether each record is a record of an IP address to be matched, a record of a start IP address, or a record of an end IP address.

For example, the sorting unit 133 sorts the records in the list combined in S3 such that values obtained by converting IP address that are primary keys into integer values are in ascending order, and TARGET, BEGIN, and END that are secondary keys are in ascending order as BEGIN<TARGET<END.

After S4, the determination unit 134 determines whether or not there is an IP address to be matched between the record of the start IP address and the end IP address to which the same index is assigned in order from the top of unprocessed records among the sorted records (S5).

Here, if the determination unit 134 determines that there is an IP address to be matched between the record of the start IP address and the end IP address to which the same index is assigned (Yes in S5), it is determined that the IP address to be matched is included in (matches) the IP address range of the index (S6). Then, if the determination unit 134 determines that all the sorted records have been processed (Yes in S7), the processing proceeds to S8. On the other hand, if the determination unit 134 determines that there is an unprocessed record (No in S7), the processing returns to S5.

In S7, when the determination unit 134 determines that all the sorted records have been processed (Yes in S7), the determination unit 134 outputs the determination result to the determination result output unit 135. Then, the determination result output unit 135 outputs the determination result of the determination unit 134 via the input/output unit 11 (S8). For example, the determination result output unit 135 outputs attribute information (e.g., web proxy, residential proxy, or the like) of the IP address range to which the IP address to be matched corresponds (matches) and the IP address to be matched.

When the matching device 10 performs the above processing, it is possible to reduce the amount of calculation required for matching even when the scale of the list of IP addresses is large. As a result, the matching device 10 can perform matching at high speed and with high efficiency even between large-scale IP address lists.

For example, in a case where the matching device 10 matches a list of 1 million IP addresses with a list of 1 million reference IP addresses, the number of times of comparison between the IP addresses can be $\frac{1}{10000}$ or less as compared with a case where the IP addresses in the lists are matched one by one. As a result, the time required for matching the lists of IP addresses can be reduced significantly.

Note that the processing of S5 in FIG. 5 described above may be performed, for example, as follows. For example, the determination unit 134 sequentially looks at unprocessed records from the top, and when finding a record to which BEGIN is added, sets a flag of an index added to the record. Moreover, when finding a record to which TARGET is added, the determination unit 134 determines that the IP address of the record to which TARGET is added is included in the IP address range corresponding to the index for which the flag is set. Moreover, when finding a record to which END is added, the determination unit 134 eliminates the flag of the index added to the record.

The determination unit 134 performs the above processing in order from the top to the last record. Then, the determination unit 134 sets the IP address range corresponding to the index with the flag as the IP address range that matches the IP address to be matched. In this way, for example, even when the IP address to be matched is included in a plurality of IP address ranges, the determination unit 134 can thoroughly detect the IP address ranges.

Figure 6:
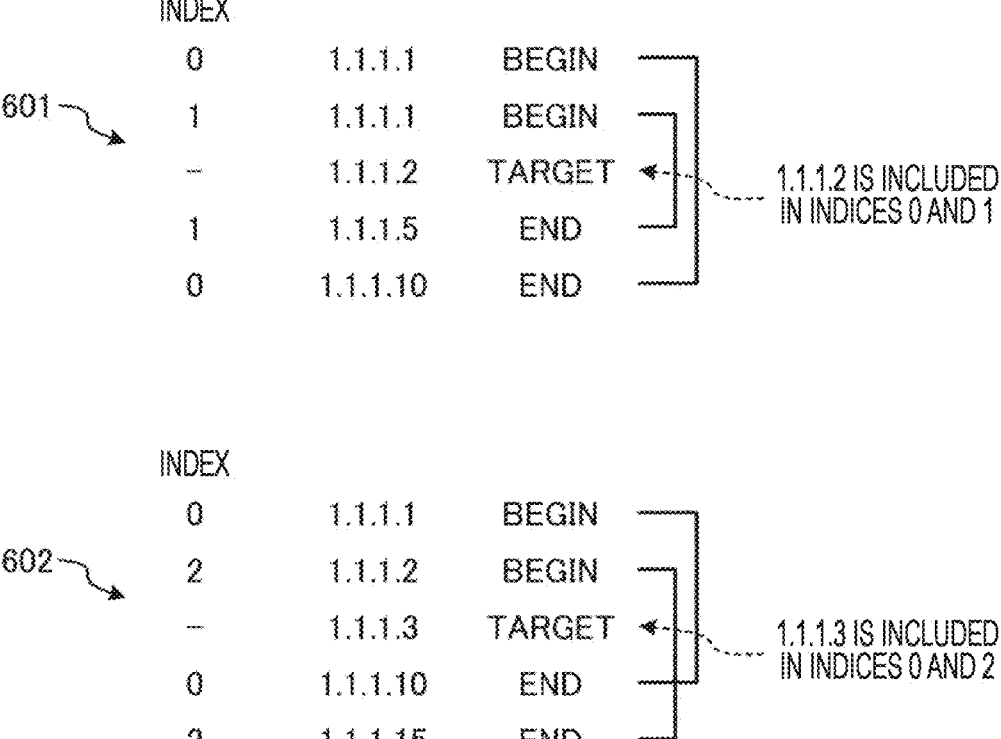
FIG. 6 is a diagram illustrating an example of determination by the matching device.

For example, as illustrated in FIG. 6, even in a case where a plurality of IP address ranges corresponding to an IP address to be matched are nested (see reference numeral 601) or partially overlapped (see reference numeral 602), the IP address ranges can be detected thoroughly.

For example, in the case of the example indicated by reference numeral 601, the determination unit 134 can detect that an IP address to be matched "1.1.1.2" is included in an index 0 (1.1.1.1-1.1.1.10) and an index 1 (1.1.1.1-1.1.1.5).

Moreover, in the case of the example indicated by reference numeral 602, the determination unit 134 can detect that an IP address to be matched "1.1.1.3" is included in the index 0 (1.1.1.1-1.1.1.10) and an index 2 (1.1.1.2-1.1.1.15).

[Application Examples] Application examples of matching of lists of IP addresses by the matching device 10 will be described with reference to FIG. 7. For example, matching of IP addresses by the matching device 10 may be applied to matching between an IP (IP address) log of credit card payment at a certain shopping site and a proxy list prepared in advance as illustrated in (1) of FIG. 7. Here, if an IP address included in the IP log corresponds to any IP address range in the proxy list prepared in advance, it can be determined that the access corresponding to the IP log is a suspicious access via a proxy.

Figure 7:
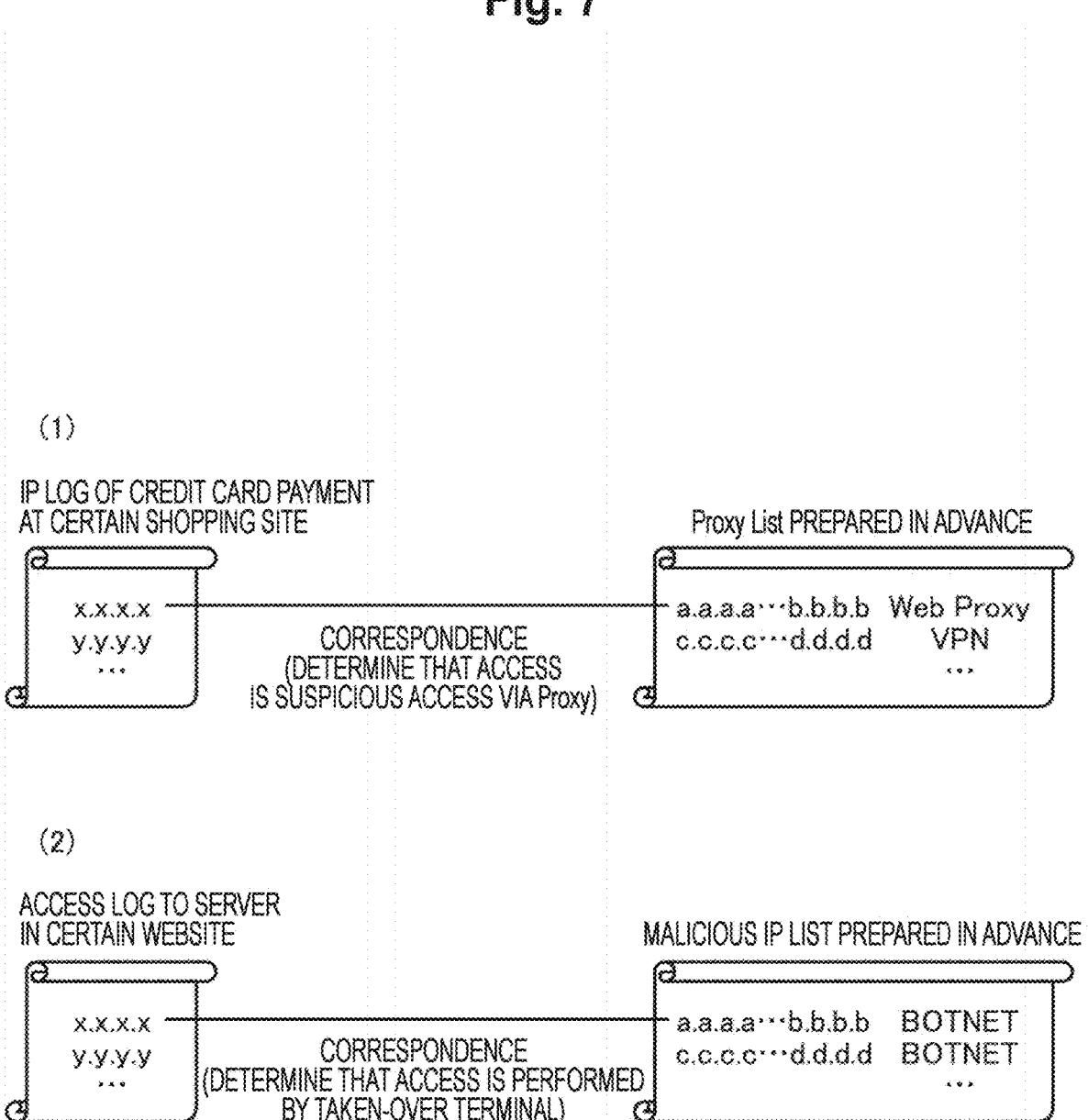
FIG. 7 is a diagram illustrating application examples of matching of IP addresses by the matching device.

Moreover, matching of IP addresses by the matching device 10 may be applied to matching between an access log to a server in a certain website and a malicious IP (IP address) list prepared in advance as illustrated in (2) of FIG. 7. Here, if an IP address included in the access log corresponds to any IP address range in the malicious IP list prepared in advance, it can be determined that the access corresponding to the IP log is an access by a taken-over terminal, for example.

[System Configuration and Others] Each component of each unit illustrated in the drawings is functionally conceptual and does not necessarily need to be physically configured as illustrated in the drawings. That is, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program executed by the CPU or can be implemented as hardware by wired logic.

In the processing described in the above embodiment, all or part of processing described as being automatically performed may be manually performed, or all or part of processing described as being manually performed may be automatically performed by a known method. In addition, the processing procedures, the control procedures, the specific names, and the information including various types of data and parameters illustrated in the above document and the drawings can be freely changed unless otherwise specified.

[Program] The matching device 10 described above can be implemented by installing a program in a desired computer as package or online software. For example, by causing an information processing device to execute the program mentioned above, it is possible to cause the information processing device to function as the matching device 10. The information processing device mentioned here includes a desktop or a laptop personal computer. Moreover, the information processing device also includes mobile communication terminals such as a smartphone, a mobile phone, and a personal handyphone system (PHS) and terminals such as a personal digital assistant (PDA).

Moreover, in a case where a terminal device used by a user is implemented as a client, the matching device 10 can also be implemented as a server device that provides a service related to the above processing to the client. In this case, the server device may be implemented as a web server or may be implemented as a cloud that provides a service related to the above processing by outsourcing.

Figure 8:
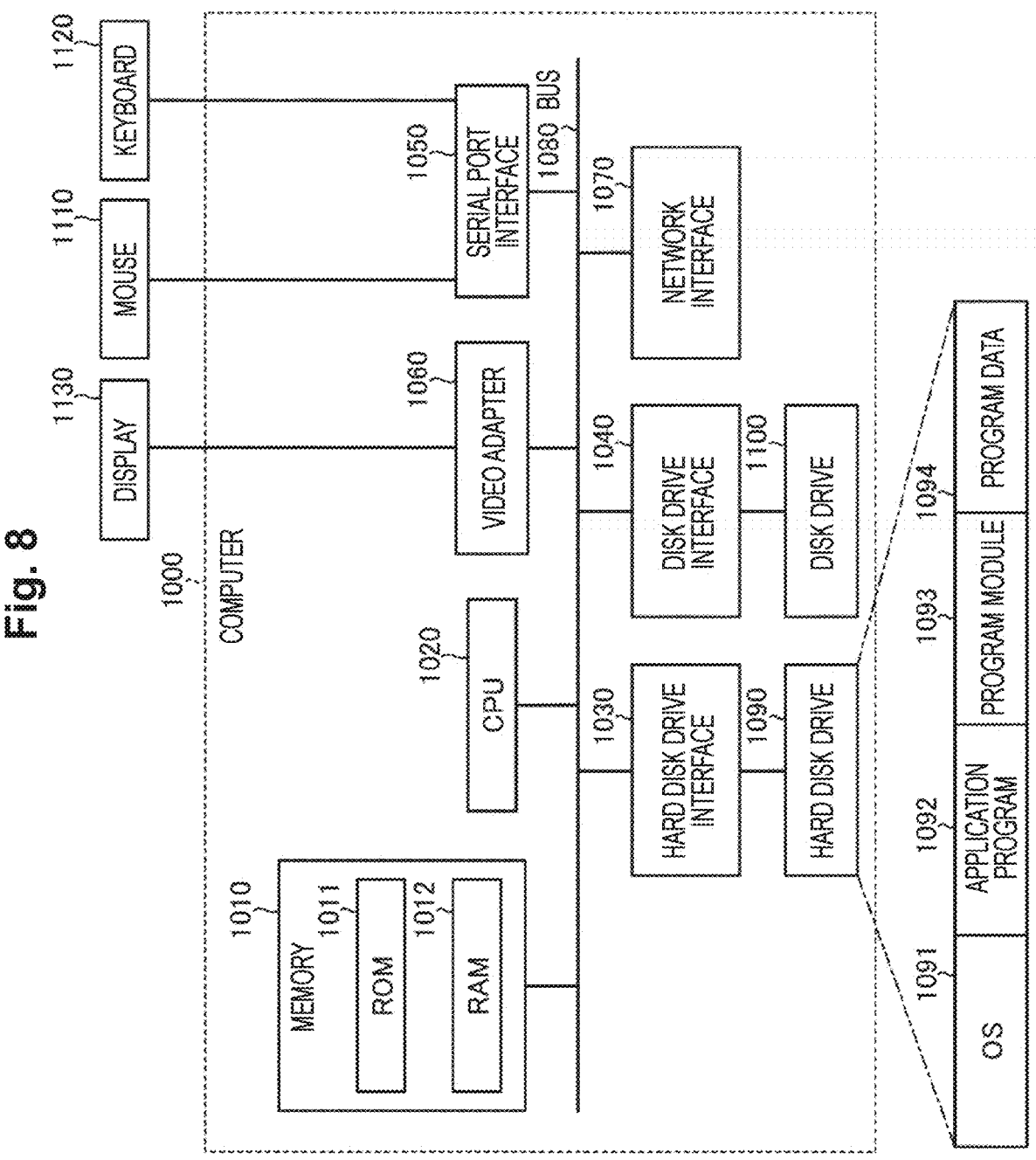
FIG. 8 is a diagram illustrating an example of a computer that executes a processing program.

FIG. 8 is a diagram illustrating an example of a computer that executes a matching program. A computer 1000 includes, for example, a memory 1010 and a CPU 1020. Moreover, the computer 1000 includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program that defines each processing performed by the matching device 10 described above is implemented as the program module 1093 in which a code executable by the computer is written. The program module 1093 is stored in, for example, the hard disk drive 1090. For example, the program module 1093 for performing processing similar to the functional configuration of the matching device 10 is stored in the hard disk drive 1090. Note that the hard disk drive 1090 may be replaced with a solid state drive (SSD).

Moreover, data used in the processing of the above embodiment is stored in, for example, the memory 1010 or the hard disk drive 1090 as the program data 1094. Then, the CPU 1020 reads the program module 1093 and the program data 1094 stored in the memory 1010 and the hard disk drive 1090 into the RAM 1012 as necessary, and executes the program module 1093 and the program data 1094.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

REFERENCE SIGNS LIST

10 Matching device
11 Input/output unit
12 Storage unit
13 Control unit
131 Generation unit 132 Combining unit
133 Sorting unit
134 Determination unit
135 Determination result output unit

The invention claimed is:

1. A matching device comprising:
processing circuitry configured to:
   generate, for each reference IP address range in a list indicating reference IP address ranges, a record indicating a start reference IP address and a record indicating an end reference IP address in the reference IP address range;
   combine (1) the record indicating the start reference IP address and the record indicating the end reference IP address of each of the reference IP address ranges and (2) a record indicating an IP address to be matched to form a combined record group;
   sort records of the combined record group using (1) an IP address of the records as a primary key and (2) indication information of the records as a second key, the indication information indicating which from among the record indicating the IP address to be matched, the record indicating the start reference IP address, and the record indicating the end reference IP address each of the records is;
   perform a determination including:
      determining that the IP address to be matched matches one of the reference IP address ranges in a case where, in the sorted combined record group, there is the record indicating the IP address to be matched between the record indicating the start reference IP address of the one of the reference IP address ranges and the record indicating the end reference IP address of the one of the reference IP address ranges, and
      determining that the IP address to be matched does not match one of the reference IP address ranges in a case where, in the sorted combined record group, there is not the record indicating the IP address to be matched between the record indicating the start reference IP address of the one of the reference IP address ranges and the record indicating the end reference IP address of the one of the reference IP address ranges; and
   output a result of the determination.

2. The matching device according to claim 1, wherein the processing circuitry is further configured to:
   sort the records of the combined record group in ascending order using the IP address of each of the records as the primary key, and
   based on the secondary key, sort the records of the combined record group in order of the record indicating the start reference IP address, the record indicating the IP address to be matched, and the record indicating the end reference IP address.

3. The matching device according to claim 1, wherein the processing circuitry is further configured to, when determining that the IP address to be matched matches any one of the reference IP address ranges, output a determination result indicating that there is a possibility that an access from the IP address to be matched is a malicious access.

4. The matching device according to claim 1, wherein the processing circuitry is further configured to, when determining that the IP address to be matched matches any one of the reference IP address ranges, output attribute information of each of the reference IP address ranges matching the IP address to be matched.

5. A matching method executed by a matching device, the matching method comprising:
   generating for each reference IP address range in a list indicating reference IP address ranges, a record indicating a start reference IP address and a record indicating an end reference IP address in the reference IP address range;
   combining (1) the record indicating the start reference IP address and the record indicating the end reference IP address of each of the reference IP address ranges and (2) a record indicating an IP address to be matched to form a combined record group;
   sorting records of the combined record group using (1) an IP address of the records as a primary key and (2) indication information of the records as a second key, the indication information indicating which from among the record indicating the IP address to be matched, the record indicating the start reference IP address, and the record indicating the end reference IP address each of the records is;
   performing a determination including:
      determining that the IP address to be matched matches one of the reference IP address ranges in a case where, in the sorted combined record group, there is the record indicating the IP address to be matched between the record indicating the start reference IP address of the one of the reference IP address ranges and the record indicating the end reference IP address of the one of the reference IP address ranges, and
      determining that the IP address to be matched does not match one of the reference IP address ranges in a case where, in the sorted combined record group, there is not the record indicating the IP address to be matched between the record indicating the start reference IP address of the one of the reference IP address ranges and the record indicating the end reference IP address of the one of the reference IP address ranges; and
   outputting a result of the determination.

6. A non-transitory computer-readable recording medium storing therein a matching program that causes a computer to execute a process comprising:
   generating for each reference IP address range in a list indicating reference IP address ranges, a record indicating a start reference IP address and a record indicating an end reference IP address in the reference IP address range;
   combining (1) the record indicating the start reference IP address and the record indicating the end reference IP address of each of the reference IP address ranges and (2) a record indicating an IP address to be matched to form a combined record group;
   sorting records of the combined record group using (1) an IP address of the records as a primary key and (2) indication information of the records as a second key, the indication information indicating which from among the record indicating the IP address to be matched, the record indicating the start reference IP address, and the record indicating the end reference IP address each of the records is;
   performing a determination including:
      determining that the IP address to be matched matches one of the reference IP address ranges in a case where, in the sorted combined record group, there is the record indicating the IP address to be matched between the record indicating the start reference IP address of the one of the reference IP address ranges and the record indicating the end reference IP address of the one of the reference IP address ranges, and determining that the IP address to be matched does not match one of the reference IP address ranges in a case where, in the sorted combined record group, there is not the record indicating the IP address to be matched between the record indicating the start reference IP address of the one of the reference IP address ranges and the record indicating the end reference IP address of the one of the reference IP address ranges; and outputting a result of the determination.

7. The matching device according to claim 1, wherein the processing circuitry is further configured to:

when the record indicating the start reference IP address is encountered during processing of the sorted combined record group, set a flag associated with an index of the record indicating the start reference IP address, and when the record indicating the end reference IP address is encountered during the processing of the sorted combined record group, eliminate a flag associated with an index of the record indicating the end reference IP address.

8. The matching device according to claim 1, wherein the list indicating reference IP address ranges includes IP addresses of proxy servers.

9. The matching device according to claim 1, wherein the list indicating reference IP address ranges includes malicious IP addresses.

10. The matching device according to claim 1, wherein the processing circuitry is further configured to convert the IP address of each of the records of the combined record group to an integer value.

11. The matching device according to claim 10, wherein the processing circuitry is further configured to sort the records of the combined record group using the integer values for sorting by the primary key.

12. The matching device according to claim 1, wherein the processing circuitry is further configured to use a Tim-sort algorithm.

13. The matching device according to claim 1, wherein the list indicating reference IP address ranges includes multiple nested reference IP address ranges.

14. The matching device according to claim 1, wherein the list indicating reference IP address ranges includes multiple reference IP address ranges that partially overlap.

15. The matching device according to claim 1, wherein the record indicating an IP address to be matched is acquired from an access log.

16. The matching device according to claim 1, wherein
the indication information indicating that a record is the record indicating the start reference IP address is BEGIN,
the indication information indicating that a record is the record indicating the IP address to be matched is TARGET, and
the indication information indicating that a record is the record indicating the end reference IP address is END.

17. The matching device according to claim 16, wherein the processing circuitry is configured to sort in the order of BEGIN, then TARGET, then END for records having a same IP address as the primary key.

18. The matching device according to claim 1, wherein the processing circuitry is further configured to:
assign a same index to the record indicating the start reference IP address and the record indicating the end reference IP address of each of the reference IP address ranges, and
determine that the IP address to be matched matches the one of the reference IP address ranges when there is the record indicating the IP address to be matched between the record indicating the start reference IP address of the one of the reference IP address ranges and the record indicating the end reference IP address of the one of the reference IP address ranges having the same index.

* * * * *